Oct. 21, 1930.  O. E. BUCKLEY ET AL  1,778,751
CONTROL OF ELECTRICAL VARIATIONS
Filed March 31, 1928
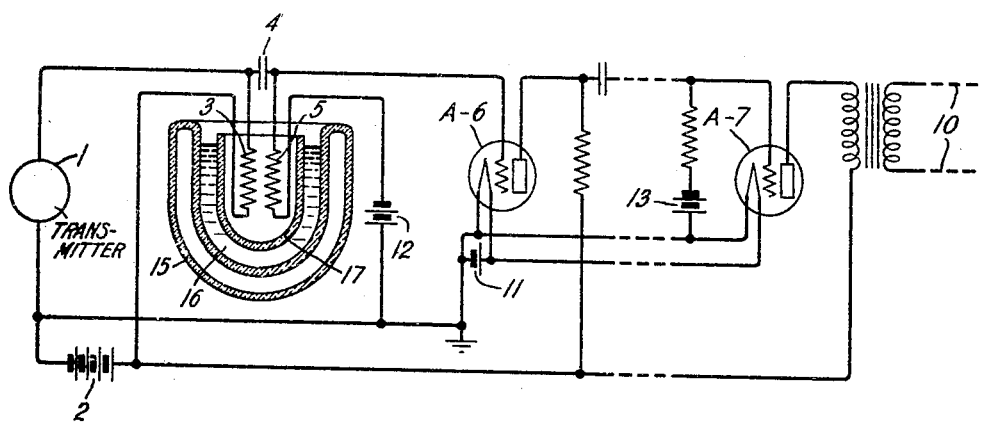
INVENTORS *Oliver E. Buckley*
*John B. Johnson*
BY
*H. A. Burgess*
ATTORNEY Patented Oct. 21, 1930

1,778,751

UNITED STATES PATENT OFFICE

OLIVER E. BUCKLEY, OF MAPLEWOOD, AND JOHN B. JOHNSON, OF MILLBURN, NEW JERSEY, ASSIGNORS TO BELL TELEPHONE LABORATORIES, INCORPORATED, OF NEW YORK, N. Y., A CORPORATION OF NEW YORK

CONTROL OF ELECTRICAL VARIATIONS

Application filed March 31, 1928. Serial No. 266,423.

This invention relates to spontaneous electric variations occurring in electric conductors, an object of the invention being to control such variations.

It has been found that ordinary electric conductors are sources of spontaneous fluctuations of voltage. This property of conductors appears to be the result of thermal agitation of the electric charges in the material of the conductor.

The effect has been measured for various conductors, in the form of resistance units, by means of a vacuum tube amplifier terminated in a thermocouple. It manifests itself as a part of the phenomenon which is commonly called "tube noise". The part of the effect originating in the resistance gives rise to a mean square voltage fluctuation $V^2$ which is proportional to the value R of that resistance. The ratio $V^2/R$ is independent of the nature or shape of the conductor, being the same for resistances of metal wire, graphite, thin metallic films, films of drawing ink, and strong or weak electrolytes. It does, however, depend on temperature and is proportional to the absolute temperature of the resistance. This dependence on temperature demonstrates that the component of the noise which is proportional to R comes from the conductor and not from the vacuum tube, or in other words is what may be termed "resistance noise".

The magnitude of the tube noise when the quietest tubes are used without input resistance (that is, with a short circuit across the grid and filament) depends inversely upon the amplification constant of the tube and is about the same as the magnitude of the noise produced by a resistance of the order of a few thousand ohms at room temperature in the input circuit. For the technique of amplification, therefore, the effect means that the limit to the smallness of voltage which can be usefully amplified is often set, not by the vacuum tube, but by the very matter of which electrical circuits are built.

For example, where a coupling resistance is used in the input circuit of an electric-space discharge amplifier tube, to couple a condenser-transmitter, a selenium cell, a photoelectric cell, or other source of weak electromotive force to the tube, the fluctuations of potential across the terminals of the resistance arising from thermal agitation of the electric charges in the resistance, may contribute a large part of the "noise" of the amplifier circuit.

It is an object of the invention to reduce disturbances resulting from spontaneous motion of electricity in conductors.

It is also an object of the invention to reduce noise or disturbances in amplifier circuits arising from thermal agitation in portions of the circuits.

A further object is to reduce noise contributed, in circuits of electric space discharge devices, by coupling resistances in the input circuits of such devices.

In the specific form of the invention shown and described herein by way of example, coupling resistances for coupling a source of weak voltage variations to an electric-space discharge amplifier tube are cooled by liquid air, or the like, to reduce random voltage fluctuations across the resistances arising from statistical fluctuations of electrical charges in the resistances.

Other objects and aspects of the invention will be apparent from the following description and claims.

The single figure of the drawing shows one embodiment of the invention diagrammatically.

A signal transmitting device 1 is supplied with current from a source of steady electromotive force 2 through a resistance 3. The device 1 may be of any of various types, as for example a condenser-transmitter, a selenium cell, or a photoelectric cell. Where the transmitter is of such nature that it does not require an energizing or polarizing source such as 2, that source may, of course, be omitted from the circuit of the transmitter.

The operation of the device 1 causes voltage variations across resistance 3, which are applied to a coupling condenser 4 and coupling resistance 5. Across resistance 5 are connected the grid and filament of an electric-space discharge amplifier tube $A^e$.

The coupling resistances 3 and 5 may have any values suitable for coupling the device 1 to the amplifier 6. Where the device 1 is a condenser-transmitter these resistances may each be of the order of megohms, for example. Or where the device 1 is a photoelectric cell the order of magnitude of these resistances may be a tenth of that just mentioned, for example. It is desirable that the value of these resistances be as small as is consistent with their efficient action from a transmission standpoint, because the smaller the resistance component of the impedance facing the grid and filament of tube $A^6$, the smaller will be the noise or disturbance in the circuit caused by thermal agitation.

The amplifier tube $A^6$ may feed into a circuit 10, through one or more amplifier stages such as $A^7$, if desired. The source 2 supplies plate potential for tubes $A^6$ and $A^7$. A source 11 supplies filament current for the tubes. Sources 12 and 13 supply negative biasing potentials for the grids of the tubes.

In order to reduce the portion of the tube circuit noise consisting of resistance noise, means are provided for artificially cooling the resistances 3 and 5. As shown, the cooling means comprise a Dewar flask 15 containing a liquid air or other cooling bath 16 in which is a vessel 17 containing the resistances 3 and 5.

While the originating source for the input electro-motive force or current has been spoken of as a transmitting element, it is to be understood that this term is generic to receiving means and any other suitable pick-ups or sources of variations to be dealt with.

What is claimed is:

1. In combination, an amplifier having an input circuit comprising a source of signal waves, a resistance in said input circuit, thermal effects in said resistance tending to cause electrical disturbances of magnitude sufficient to produce substantial degradation of signals, and means for reducing the temperature of said resistance sufficiently below the temperature of the medium surrounding the amplifier to substantially reduce said degradation.

2. In combination, a source of weak signal variations, an amplifier for amplifying said variations, coupling means comprising a resistance of an order of magnitude of at least several thousand ohms for coupling said source to said amplifier, the inherent characteristics of said resistance tending to cause substantial distortion of the signal variations, and means for substantially reducing said tendency.

3. In a circuit for an amplifying device, means for supplying signal variations to said device, said means producing disturbing variations that cause substantial loss of intelligibility in the signals, and means for cooling said first mentioned means to a temperature sufficiently below that of the medium surrounding the amplifying device to substantially reduce said loss of intelligibility.

4. In combination, an electric space discharge device, an input circuit for said device, means, included in said input circuit, supplying to said device variations which it is desired to transmit through said device and variations, comparable in magnitude to the first mentioned variations, that cause substantial distortion of the first mentioned variations transmitted through said device, and means comprising a cooling bath for cooling a portion of said first mentioned means sufficiently to substantially reduce said distortion.

5. In a circuit comprising an electric-space discharge tube and an external input circuit therefor which tends to contribute a substantial portion of the total tube circuit noise, because of thermal effects in said input circuit, means for sufficiently reducing the temperature of such a portion of said input circuit as to substantially reduce the ratio of the tube circuit noise resulting from thermal effects in said input circuit to the total tube circuit noise.

6. A tube circuit including a three-electrode electric-space discharge amplifier tube, in which a substantial portion of the total tube circuit noise is the result of thermal agitation of electric charges in the circuit connecting the cathode and the discharge control electrode of the tube, and means for cooling a portion of the latter circuit sufficiently to substantially reduce the total tube circuit noise.

7. The method of reducing resistance noise caused by spontaneous fluctuations of voltage in electrically conductive material of a signaling system in which the order of magnitude of the energy level in the material is at least as low for the signal energy as for the resistance noise energy, which comprises cooling the material sufficiently below the temperature of the surrounding medium to substantially improve the intelligibility of the signals.

8. In combination, a signaling circuit comprising resistance, thermal effects in said resistance tending to cause electrical disturbances of magnitude sufficient to produce substantial degradation of signals, and means for reducing the temperature of said resistance sufficiently below the temperature of the medium surrounding said resistance and said means to substantially reduce said degradation.

In witness whereof, we hereunto subscribe our names this 27th day of March, 1928.

OLIVER E. BUCKLEY.
JOHN B. JOHNSON.